United States Patent [19]
Smyk

[11] Patent Number: 6,128,379
[45] Date of Patent: Oct. 3, 2000

[54] INTELLIGENT DATA PERIPHERAL SYSTEMS AND METHODS

[75] Inventor: Darek A. Smyk, Piscataway, N.J.

[73] Assignee: Telcordia Technologies, Inc., Morristown, N.J.

[21] Appl. No.: 09/206,121

[22] Filed: Dec. 3, 1998

Related U.S. Application Data

[60] Provisional application No. 60/067,221, Dec. 3, 1997.

[51] Int. Cl.[7] ............................ H04M 7/00; H04M 11/00; H04L 12/66
[52] U.S. Cl. ...................... 379/230; 370/353; 379/93.01; 379/220; 379/900
[58] Field of Search .................................. 379/93.01, 207, 379/219, 220, 229, 230, 900; 370/352, 353, 354, 355, 356

[56] References Cited

U.S. PATENT DOCUMENTS

| | | | |
|---|---|---|---|
| 5,594,789 | 1/1997 | Seazholtz et al. | 379/207 |
| 5,712,903 | 1/1998 | Bartholomew et al. | 379/207 X |

*Primary Examiner*—Harry S. Hong
*Attorney, Agent, or Firm*—Joseph Giordano

[57] ABSTRACT

Intelligent network components, systems, and methods supporting public switch telephone network users equipped with data communications devices such as personal computers. An Intelligent Data Peripheral allows the exchange of data messages between PSTN users and the Intelligent Data Peripheral under the guidance of service logic residing in intelligent network Service Control Point systems. In general, the intelligent network services involving the use of an Intelligent Data Peripheral have similar call flows to services involving the use of a traditional Intelligent Peripheral. When the PSTN call originator attempts to establish a call, the Service Switching Point (intelligent network capable switch) under the guidance of the Service Control Point system routes the call to an Intelligent Data Peripheral. Then, the call originator interacts with the Intelligent Data Peripheral. Finally, based on information supplied by the user and user's data application running on user's personal computer, as well as the service logic and service subscriber's data stored on the Service Control Point (or other databases external to Service Control Point), the Service Control Point request the Service Switching Point to route the call to its final destination. The Intelligent Network Data Services Node provided the functionality of a service Switching Point, a Service Control Point, and an Intelligent Data Peripheral. Accordingly, the Intelligent Data Services Node is capable of performing switching functions (like Service Switching Point), data interaction functions (like Intelligent Data Peripheral) and service logic control (like Service Control Point).

15 Claims, 5 Drawing Sheets

INTELLIGENT DATA PERIPHERAL SYSTEMS AND METHODS

CROSS-REFERENCE TO RELATED APPLICATIONS

This application claims the benefit of U.S. provisional application Ser. No. 60/067,221, filed Dec. 3, 1997, the contents of which are hereby incorporated by reference.

BACKGROUND OF THE INVENTION

The present invention relates generally to data communications, and more particularly to intelligent network components supporting intelligent network services for data-based communications between a network and its subscribers.

Intelligent Peripheral and Services Node are well established components of intelligent networks that include the Public Switched Telephone Network (PSTN). These components allow voice-based interaction between subscribers and an intelligent network. FIG. 1 illustrates an example of network deployment of these components. The intelligent network 100 includes the PSTN 102, an Intelligent Peripheral (IP) 101, a Service Control Point (SCP) 103, a Services Node 104, and a plurality of end users or subscribers 105. The IPs 101 are capable of playing voice announcements and collecting DTMF input, performing voice recognition, text to speech synthesis, voice identification, and other voice based interactions. Some IPs are also capable of interacting with users through an Analog Display Service Interface (ADSI) phone, where ADSI phones support the exchange of text messages between users and an IP.

Service logic programs residing in the SCP 103 control the interactions between the PSTN's end users and IP 101. The SCP 103 communicates with the IP 101 in one of two ways. The first method involves a direct communication link between the SCP 103 and the IP 101. The second method involves the SCP 103 communicating with the IP 101 through the intelligent network switches 106, i.e. Service Switching Points (SSP).

Intelligent network services involving the use of IPs have the following call flows. When a PSTN subscriber unit 105 originates a call, the SSP 106, under the guidance of the SCP 103, routes the call to the IP 101. Then, the caller 105 interacts with the IP 101 under the control of the SCP 103. Finally, based on information supplied by the caller 105, as well as the service logic and subscriber's data stored at the SCP 103 or in databases external to the SCP 103, the SCP 103 requests the SSP 106 to route the call to its final destination. Incoming call screening with PIN override is an example of a simple service involving the above described call flow. In this case the IP 101 based interactions are used for validating the PIN before the call is routed.

Services Nodes are also well established components that allow voice-based interactions between subscribers and an intelligent network. At a very high level, a conventional Services Node performs all of the functions of an SSP, an SCP, and an IP. Accordingly, the Services Node is capable of performing switching functions like an SSP, voice interaction functions like an IP, and service logic control like an SCP.

FIG. 2 presents a network architecture supporting the conventional method of providing Internet/intranet dial-up access. An access server 201 acts as an interface between the PSTN 202 and a data network 203. The Authorization-Authentication-Accounting (AAA) Server 204 includes one or more servers that perform authentication, authorization, and accounting functions. The explosive growth of the Internet, however, creates problems for the PSTN 202, which for the foreseeable future will provide the majority of users with Internet access via dialup modems. Also, today, many mobile business users remotely access corporate data networks (intranets) via the PSTN 202. Based on current growth rates, the volume of Internet/intranet related traffic on the PSTN 202 is forecasted to rival or overtake "regular" telephone or fax traffic in the next few years. The current method of accessing the Internet causes resource problems for the PSTN. Long holding times for Internet access calls tie up both switch resources and interoffice trunks causing congestion that affects all PSTN users. Additional PSTN resources are wasted on ineffective call attempts made by Internet users repeatedly trying to connect to overloaded Internet Service Provider facilities.

One solution to the PSTN congestion problems caused by Internet/intranet access involves off-loading the Internet/intranet access traffic onto a separate data network. FIG. 3 presents a conventional high level off-load architecture. A key element of this off-load architecture is to move modem functionality away from ISPs/Enterprises 302 and closer to end users 304 so that Internet/intranet calls can be converted to packet format as early as possible to take advantage of multiplexing gains. This means that the access router 301 of FIG. 3 would include modem emulation capabilities, as well as support authentication and authorization functions. However, the ISPs/Enterprises 302 are reluctant to give up control over authenticating and authorizing their users.

In the architecture presented in FIG. 3 the Intelligent Network can perform the following functions/services:
 a) Identify Internet/intranet access calls and route them to data network access routers 301;
 b) Implement enhanced PSTN routing services such as:
  Single number service routing calls to the nearest ISP/Enterprise point of presence;
  Traffic distribution service distributing access calls between multiple ISP/Enterprise points of presence;
 c) Perform throttling of idle call attempts.

In the architecture presented in FIG. 3, however, the SCP 303 cannot exchange data with a subscriber 304 to determine the identity of the subscriber and his/her service preferences. The SCP 303 has access only to the calling number of the caller's phone line. By the time the user is authenticated by the AAA server 302, the SCP 303 involvement in the call setup is over. This imposes certain limitations and prevents the intelligent network from offering a multitude of beneficial services.

Therefore, it is desirable to have a method and system for overcoming the disadvantages of the prior art.

SUMMARY OF THE INVENTION

Accordingly, the present invention is directed to intelligent network components, systems, and methods that substantially obviates one or more of the problems due to limitations and disadvantages of the related art.

In accordance with one aspect of the invention, a network element includes one or more data modems for processing data from a caller according to a data-based protocol, a control interface to be connected to an SCP, and an intelligent data peripheral controller to control the exchange of data between the SCP and the data modems.

In accordance with another aspect of the invention, a telecommunications network includes an SCP to control routing of the call, an intelligent data peripheral which allows communication between the SCP and the subscribers, a telephone network connected to the SCP and the intelligent data peripheral, an access router which communicates with a server that provides one or more of authentication, authorization, and accounting services, the access router connected to the telephone network and one or more data networks which are connected to the access router, and the intelligent data peripheral is connected to at least one of the data networks.

In another embodiment, the invention corresponds to a method of routing data-based calls in a network including the steps of routing a call to an intelligent data peripheral, the intelligent data peripheral communicating with the subscriber to allow one or more of authentication-authorization-accounting services, communicating the results from the authentication-authorization-accounting from the intelligent data peripheral to the SCP, determining the caller's final destination at the SCP, and instructing the SSP to route the call to said final destination.

In another network element embodiment, the invention includes means for performing all switching functions of a SSP on a data-based call, means for performing all data interaction functions of an intelligent data peripheral, and means for performing all service logic control of a SCP.

It is to be understood that both the foregoing general description and the following detailed description are exemplary and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

BEST MODE FOR CARRYING OUT THE INVENTION

Reference will now be made in detail to the preferred embodiments of the invention, examples of which are illustrated in the accompanying drawings. The description for carrying out the best mode of the invention should not restrict the scope of the claimed invention. It provides examples and explanations to enable others to practice the invention. The accompanying drawings, which form part of the description for carrying out the best mode of the invention, show several embodiments of the invention, and together with the description, explain the principles of the invention.

The present invention involves two new intelligent network components to accommodate the use of the PSTN for data communications: an Intelligent Data Peripheral (IDP) and an Intelligent Data Services Node (IDSN). These components support deployment of new intelligent network services leading to new revenues for intelligent network operators. The IDP can perform the functions of traditional IPs but it also can support different types of PSTN users. While the traditional IP generally assumes that the PSTN user is equipped with a voice capable device, e.g. telephone, the IDP of the present invention supports PSTN users equipped with data communications devices such as personal computers (PCs) with modems. Accordingly, interactions that occur between the PSTN user and the IDP are exchanges of data messages performed under the guidance of service logic residing in intelligent network SCP systems.

Figure 1:
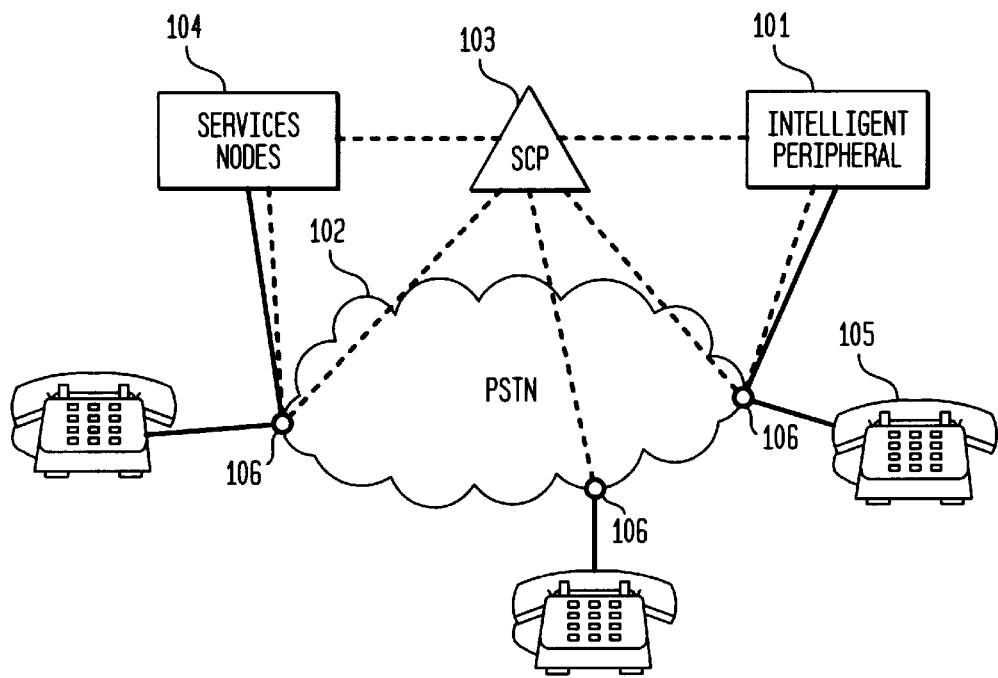
FIG. 1 illustrates network deployment of an IP and Services Node in a PSTN intelligent network.
Figure 2:
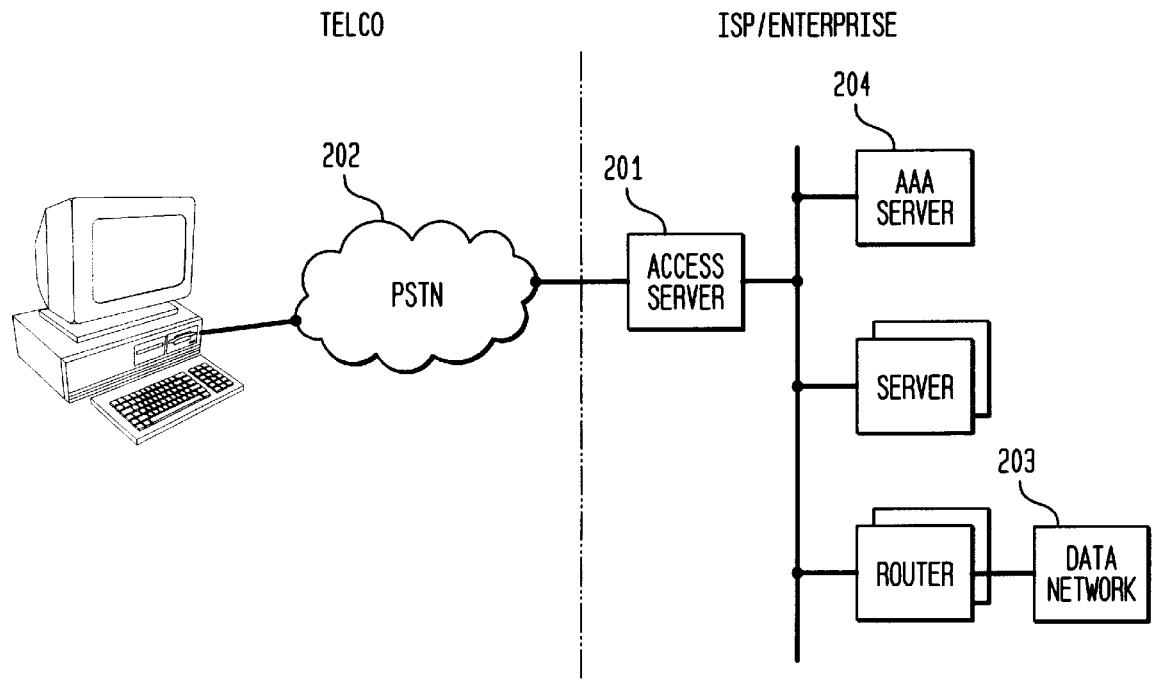
FIG. 2 presents a prior art architecture for providing Internet/intranet dial-up access.
Figure 3:
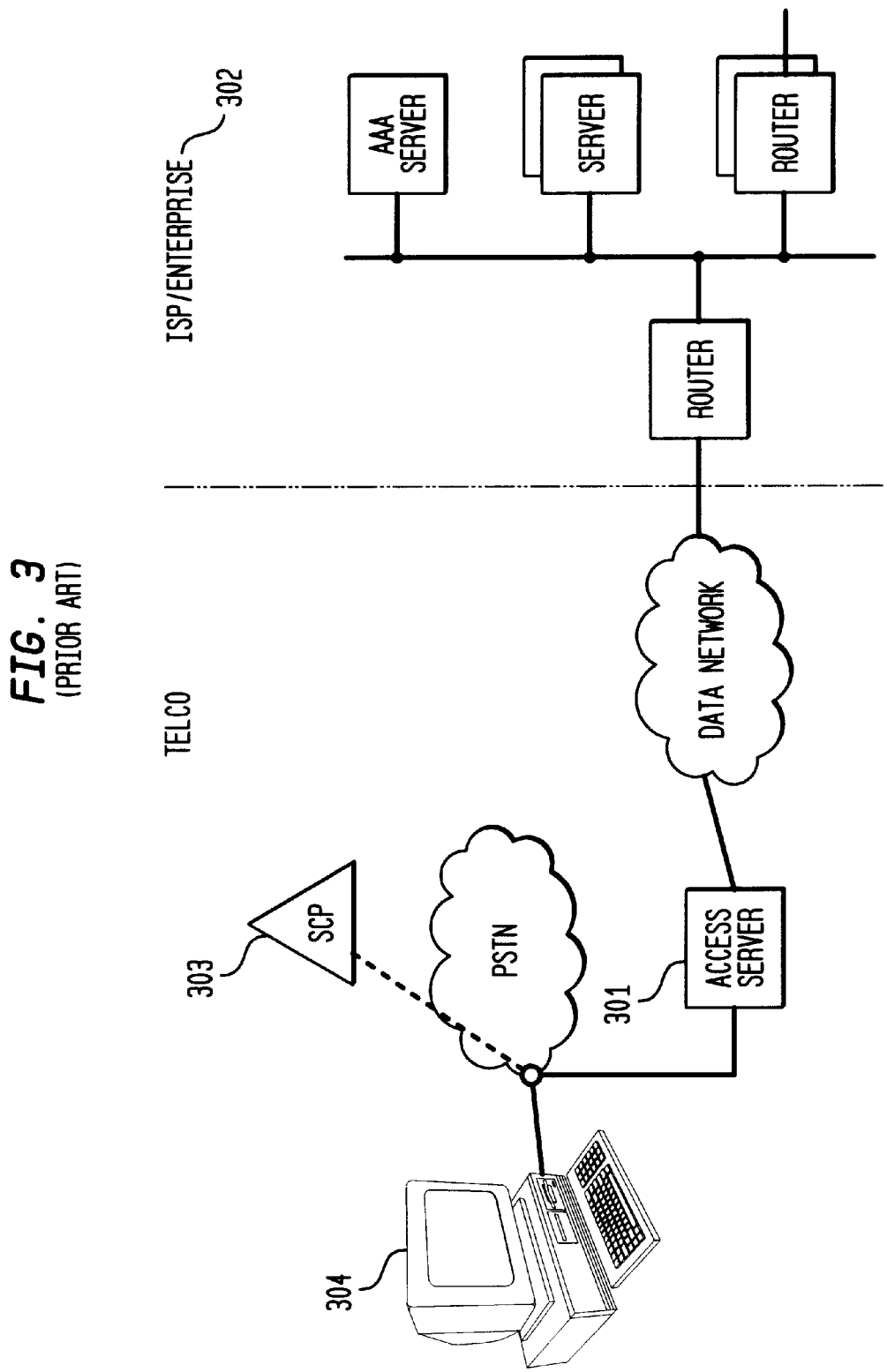
FIG. 3 presents a prior art solution for off-loading Internet/intranet access traffic onto a separate data network.
Figure 4:
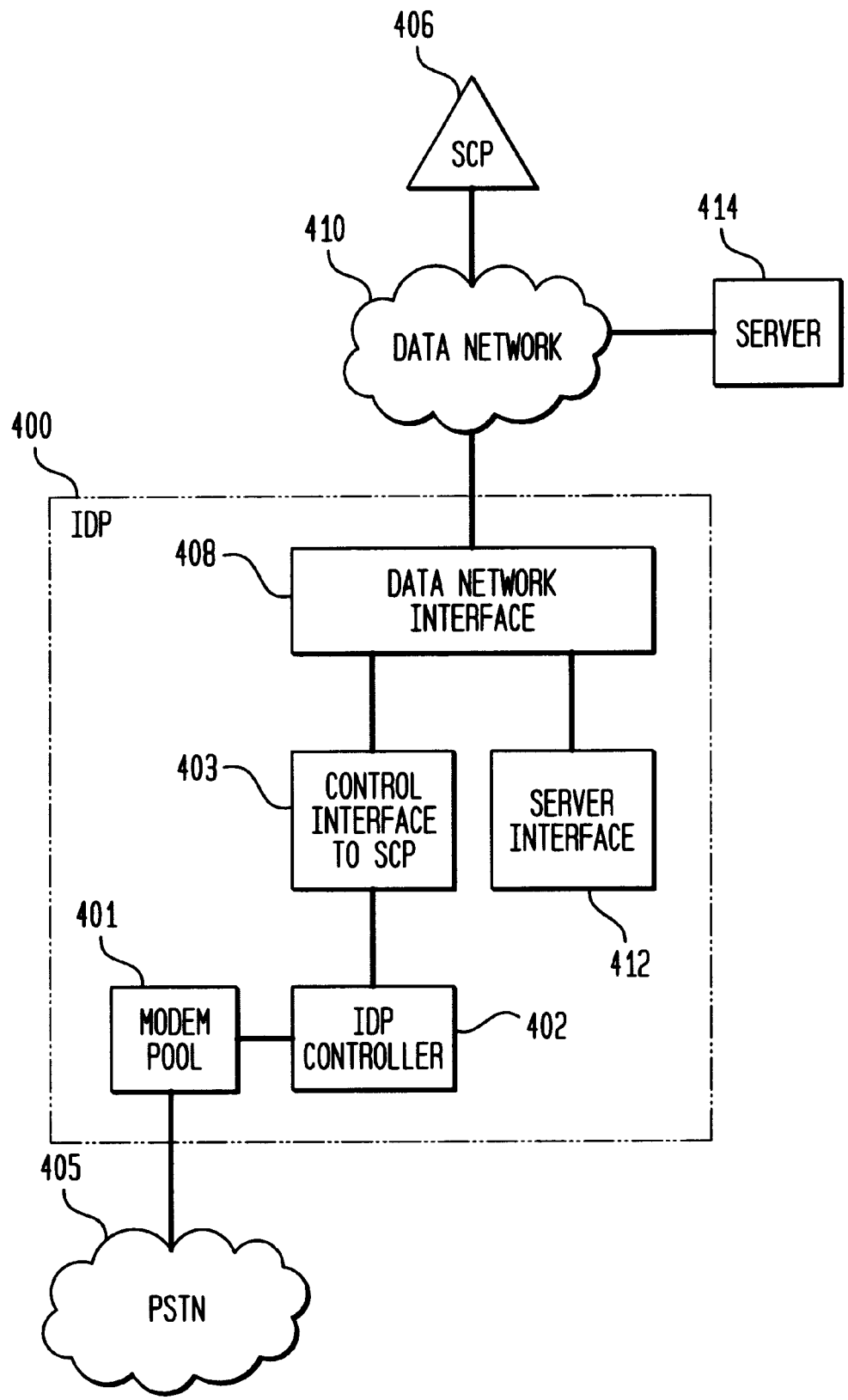
FIG. 4 is a block diagram of an Intelligent Data Peripheral in accordance with one embodiment of the invention.

The IDP 400 shown in FIG. 4 includes a modem pool 401 comprising one or more modems for connecting to the PSTN 405, a control interface to the SCP 403, an IDP controller 402 to control communications between the SCP 406 and the caller, and a data network interface 408 for interfacing with a data network 410 between it and the SCP 406. The IDP controller 402 preferably resides between the modem pool 401 and the control interface to the SCP 403. Optionally, the IDP 400 performs conventional voice based interactions and preferably includes conventional hardware and software for performance of these operations (not shown). IDP 400 may also include a server interface 412 to interface with a server 414 connected to data network 410.

The SCP 406 can communicate with the IDP 400 using conventional methods of interactions between an SCP and an IP, i.e. direct interface or indirect interface through an SSP. In general, the intelligent network services involving the use of an IDP have similar call flows to services involving the use of a traditional IP.

Figure 7:
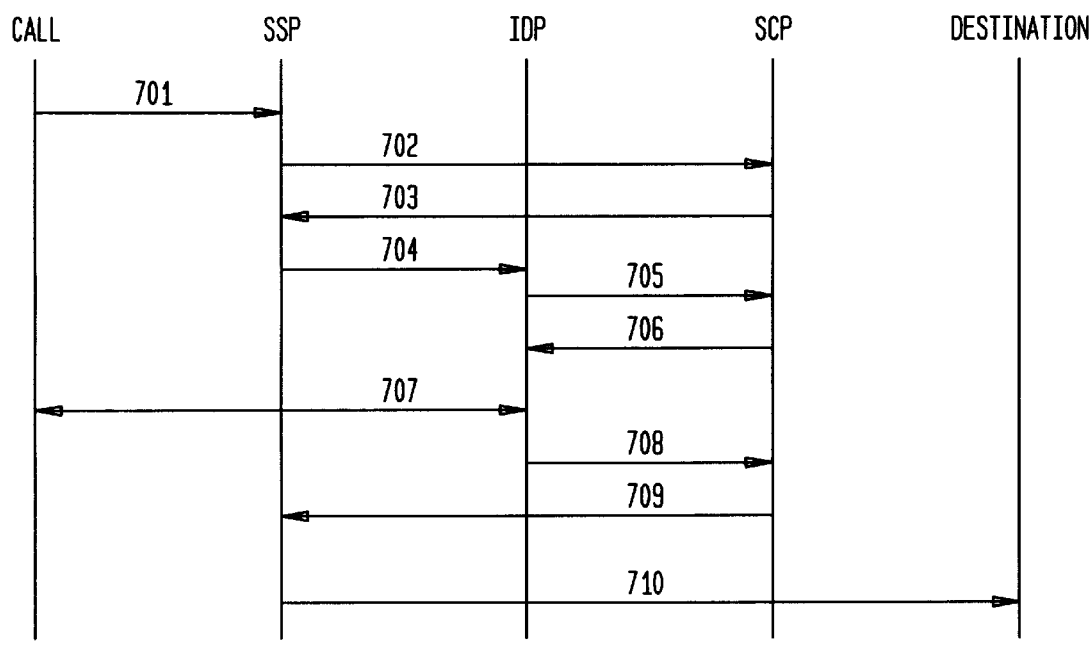
FIG. 7 is a call flow diagram of a telecommunications system that includes an Intelligent Data Peripheral in accordance with one embodiment of the invention; and, FIG. 8 illustrates an architecture of a telecommunications system that includes an Intelligent Data Services Node in accordance with one embodiment of the invention.

FIG. 7 shows a call flow diagram for one embodiment of the invention. When the PSTN call originator attempts to establish a call (step 701), the SSP requests call processing instructions from the SCP (steps 702 and 703). As instructed by the SCP, the SSP routes the call to an IDP (step 704). The IDP then requests instructions from the SCP (steps 705 and 706). Then, the call originator interacts with the IDP (step 707). The IDP reports the results of the interaction to the SCP (step 708). Finally, based on information supplied by the user and the user's data application running on user's PC, as well as the service logic and service subscriber's data stored on the SCP (or other databases external to SCP), the SCP instructs the SSP (step 709) to route the call to its final destination (step 710).

Analogously, the Intelligent Data Services Node (IDSN) functionality according to the invention is capable of performing switching functions (like an SSP), data interaction functions (like an IDP), and service logic control (like an SCP) for data-based communications with subscribers.

Figure 5:
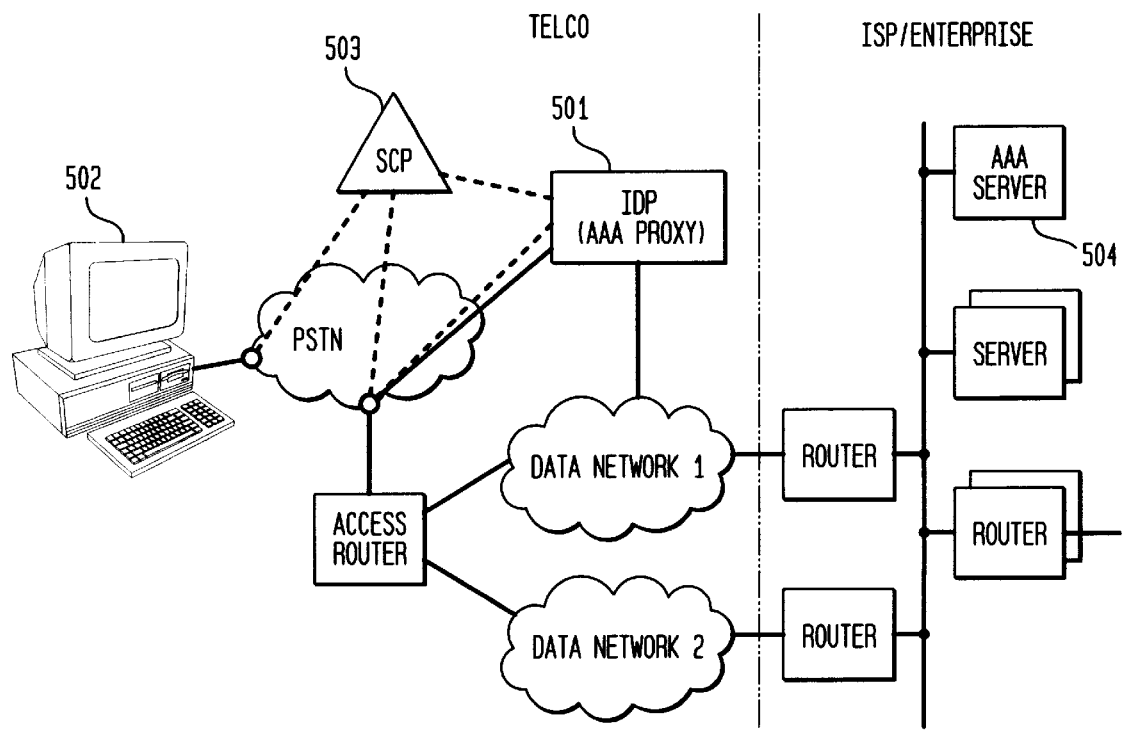
FIG. 5 illustrates a network architecture of a telecommunications system that includes an Intelligent Data Peripheral in accordance with one embodiment of the invention.

FIG. 5 presents an IDP based network architecture that allows PSTN callers with PC's to access the Internet via dialup modems according to one embodiment of the invention. In this architecture, the IDP 501 authenticates and authorizes the caller before the call is routed to the appropriate destination, i.e. the appropriate port on the appropriate access router. When the caller attempts to make an Internet/ intranet access call from a PC 502, the SSP queries the SCP 503 for instructions. In response, the SCP 503 requests the SSP to temporarily route the call to the IDP 501. After the call between the caller's PC 502 and the IDP 501 is established, the IDP 501 authenticates and authorizes the user. Note, in the scenario presented in FIG. 4, the IDP 501 acts as an AAA proxy querying the AAA server 504 operated by an ISP/Enterprise to assist it in performing AAA functions. After the IDP 501 completes the authentication and authorization operations it reports the outcome to the SCP 503. Based on this information, the SCP 503 instructs the SSP to route the call to the appropriate destination.

Figure 6:
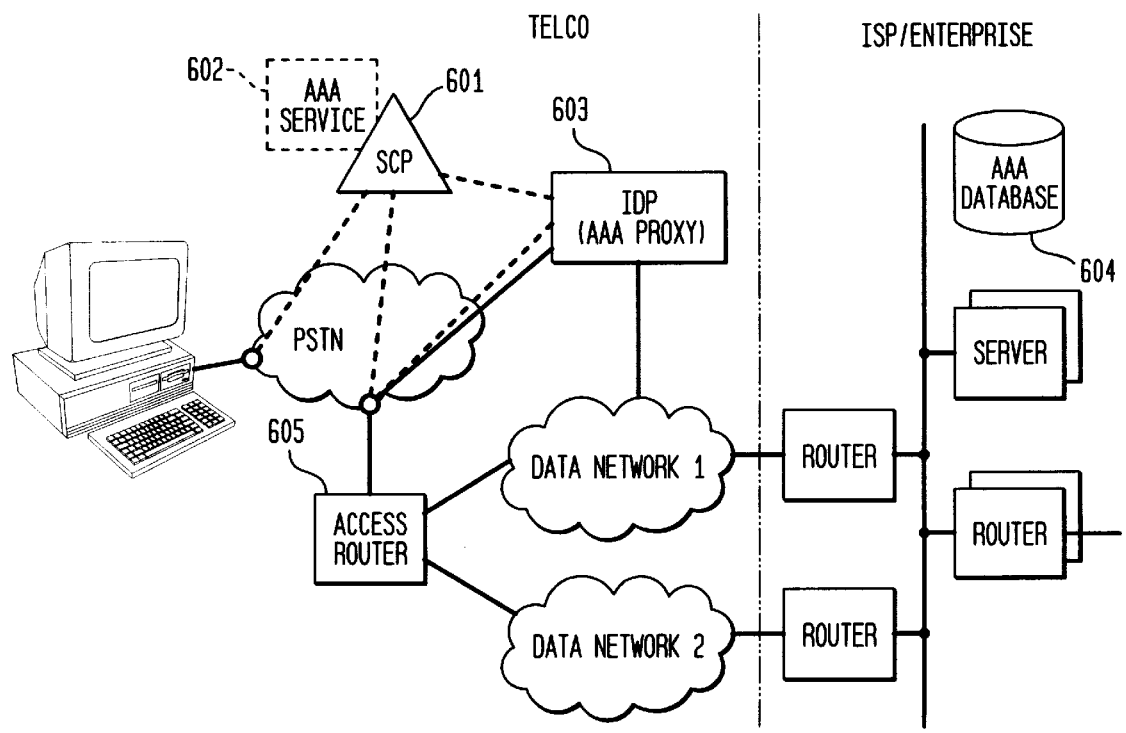
FIG. 6 illustrates a network architecture of an Intelligent Data Peripheral in accordance with another embodiment of the invention.

FIG. 6 presents another embodiment of a network with an IDP. In this embodiment the SCP 601 is the platform for creation and deployment of AAA services 602 and the IDP 603 acts as a proxy to these services. The flexible SCP's 601 service creation environment allows for customization of AAA services 602. In addition, the ease of programming the SCP 601 services reduce the time to market for new versions of AAA services 602. It also supports flexible deployment configuration, for example in situations where the ISP/Enterprise insists on controlling AAA databases 604, the SCP 601 service logic could query these databases in the process of offering the AAA services 602.

In the embodiment presented in FIG. 6, the SCP 601 is preferably programmed and equipped to perform the following functions/services:

a) Identify Internet/intranet access calls and route them to data network access routers 605;

b) Implement enhanced PSTN routing services, which include routing, based on customer identity such as:
   Routing caller to ISP/Enterprise point of presence providing level of Internet/intranet access service matching customer profile;
   Single number service routing calls to the nearest ISP/Enterprise point of presence;
   Traffic distribution service distributing access calls between multiple ISP/Enterprise points of presence;

c) Perform AAA functions;

d) Support graphic, data, or audio "hold" services for Internet/intranet access calls by temporarily parking the access calls on the IDP before the ISP/Enterprise access resources are available;

e) Support roaming users;

f) Perform throttling of idle call attempts.

Figure 8:
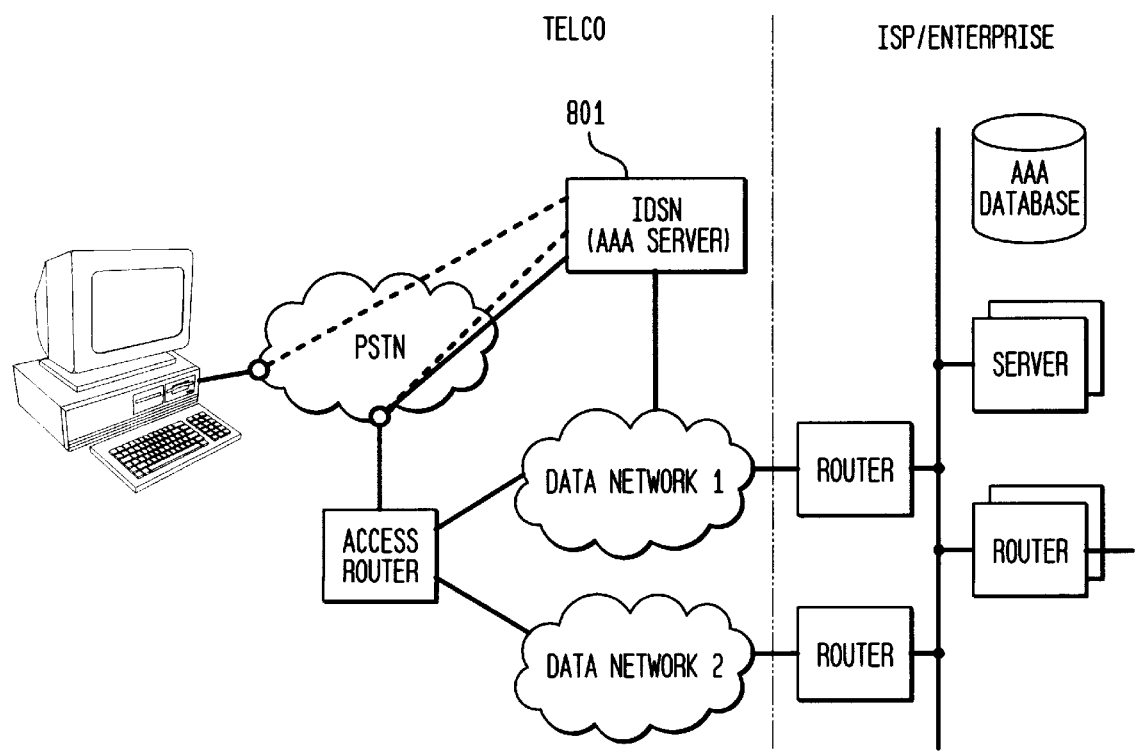

FIG. 8 presents the architecture for an intelligent network with an IDSN 801 according to one embodiment of the invention. In this architecture, the IDSN 801 replaces and performs all the functions that were performed by the IDP 501 and SCP 503 in FIG. 5. The deployment of an IDSN may be appropriate in smaller scale operations or in a network where SCP components are not deployed.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for controlling data communications calls in a telephone network, comprising the steps of:

in response to a telephone call from a subscriber through the telephone network to a data network provider, launching a query from an SSP to an SCP for call handling instructions;

in response to instructions from the SCP, routing the call to an intelligent data peripheral;

sending a message from the intelligent data peripheral to the SCP requesting instructions;

establishing a data connection through the telephone network between the user and the intelligent data peripheral;

performing application processing at the intelligent data peripheral;

sending a message from the intelligent data peripheral to the SCP including information obtained from the user during the connection;

determining routing instructions in the SCP based on customer information;

sending routing instructions from the SCP to the SSP; and in response to a routing message from the SCP, routing the call to a port on an access server.

2. The method of claim 1 wherein the step of performing application processing includes the step of performing authentication and authorization of the user.

3. The method of claim 2 wherein the step of performing authentication and authorization of the user comprises the steps of:

interacting with the user to obtain authentication and authorization information;

querying a remote authentication and authorization server for assistance in performing the authentication and authorization process;

in response to information sent from the remote authentication and authorization server, completing user authentication and authorization at the intelligent data peripheral; and sending a message from the intelligent data peripheral to the SCP reporting the outcome of the authentication and authorization process.

4. The method of claim 2 wherein the step of performing authentication and authorization of the user comprises the steps of:

interacting with the user to obtain authentication and authorization information;

sending a message from the intelligent data peripheral to the SCP including user authentication and authorization information;

querying a remote authentication and authorization from the SCP for assistance in performing the authentication and authorization process; and in response to information sent from the remote authentication and authorization server, completing user authentication and authorization.

5. The method of claim 2 wherein the step of performing authentication and authorization of the user comprises the step of:

interacting with the user to obtain authentication and authorization information;

sending a message from the intelligent data peripheral to the SCP including user authentication and authorization information; and completing user authentication and authorization at the SCP.

6. The method of claim 1 wherein the step of determining the routing instructions for the call includes the step of identifying a data network provider point of presence based on sevice information contained in a customer profile.

7. The method of claim 1 wherein the step of determining the routing instructions for the call includes the step of identifying the nearest data network provider point of presence to the user.

8. The method of claim 1 wherein the step of determining the routing instructions for the call includes the step of identifying a data network provider point of presence based on traffic distribution parameters.

9. A method for intelligent routing of data network access calls in a telephone network, comprising the steps of:

in response to a telephone call from a user through the telephone network to a data network provider, routing the call to an intelligent data services node;

establishing a data connection through the telephone network between the user and the intelligent data services node;

performing application processing at the intelligent data services node;

determining the routing instructions for the call; and routing the call to a port on an access server.

10. The method of claim 9 wherein the step of performing application processing at the intelligent data services node includes the step of performing authentication and authorization of the user.

11. The method of claim 10 wherein the step of performing authentication and authorization of the user comprises the step of:

interacting with the user to obtain authentication and authorization information;

querying a remote authentication and authorization server from the intelligent data services node for assistance in performing the authentication and authorization process; and in response to information sent from the remote authentication and authorization server, completing user authentication and authorization at the intelligent data services node.

12. The method of claim 10 wherein the step of performing authentication and authorization of the user comprises the step of:

interacting with the user to obtain authentication and authorization information; and completing user authentication and authorization at the intelligent data services node.

13. The method of claim 9 wherein the step of determining the routing instructions for the call includes the step of identifying a data network provider point of presence based on service information contained in a customer profile.

14. The method of claim 9 wherein the step of determining the routing instructions for the call includes the step of identifying the nearest data network provider point of presence to the user.

15. The method of claim 9 wherein the step of determining the routing instructions for the call includes the step of identifying a data network provider point of presence based on traffic distribution parameters.

* * * * *